United States Patent

[11] 3,550,770

[72] Inventors Svend Aage Lund
Egebakken;
Allan Northeved, Bagsvaerd, Denmark

[21] Appl. No. 742,780
[22] Filed July 5, 1968
[45] Patented Dec. 29, 1970
[73] Assignee Svejsecentralen
Glostruk, Denmark
[32] Priority July 7, 1967
[33] Denmark
[31] No. 3532/67

[54] METHOD FOR AUTOMATIC SORTING OR RECORDING OF OBJECTS AND APPARATUS FOR CARRYING OUT THE METHOD
15 Claims, 10 Drawing Figs.

[52] U.S. Cl. .......... 209/111.7
[51] Int. Cl. .......... B07c 3/14
[50] Field of Search .......... 209/111.5, 111.7, 111.6; 178/6IND

[56] References Cited

UNITED STATES PATENTS

| | | | |
|---|---|---|---|
| 3,230,305 | 1/1966 | Kendrick | 209/111.5X |
| 3,409,129 | 11/1968 | Sperry | 209/111.5X |
| 3,429,437 | 2/1969 | Terschanski et al. | 209/111.5 |

*Primary Examiner*—Allen N. Knowles
*Attorney*—Robert E. Burns

ABSTRACT: Method and apparatus for automatic sorting or recording of objects placed individually in or caused to pass the field of vision of at least one video camera, which records an optical reproduction of a visual, coded information provided on each object, said information indicating the sorting destination or other characteristics of each object by means of a code consisting of at least one group of parallel lines or concentric rings and being so formed that the complete information can be registered by a single line scanning whereafter the video signals produced by the camera via electronic circuits control sorting or registration means.

METHOD FOR AUTOMATIC SORTING OR RECORDING OF OBJECTS AND APPARATUS FOR CARRYING OUT THE METHOD

FIELD OF THE INVENTION

Method and apparatus for sorting or registration of objects each being provided with a visual, coded information by means of labels, stamping or like markings, which information is used to control sorting or recording means.

DESCRIPTION OF PRIOR ART

Methods and apparatus of the above-mentioned type are known and used, for example, in sorting or recording of bank checks or in reading letters from a printed document, but existing methods and apparatus require that the visual coded information must be supplied to the apparatus in correct reading direction and exact angle and at a relatively steady speed past a reading head. The known methods and apparatus cannot be used in sorting or registration of objects having irregular form varying from object to object, for example mechanical parts on an industrial band conveyor or series of shopping objects from a super market, where said objects and their coded information may have random orientation and different spatial position in relation to recording means, for example, to the scanning lines of a video camera.

SUMMARY OF THE INVENTION

The purpose of the invention is to provide a method and an apparatus adapted to sort or register objects or irregular form variable from object to object and provided with coded information consisting of parallel lines or concentric rings which objects and their coded information have random orientation and different spatial position in relation to the recording means, for example the field of vision of a video camera.

The invention concerns a method for the automatic sorting or recording of objects which by individual marking with labels, stamping or similar marking are supplied with a visual code which indicates the sorting destination or other characteristic of each object, which information is used to control sorting or recording means.

Methods of the above-mentioned type are known and used, for example, in sorting or recording of bank checks but existing methods generally require the visual, coded information to be fed straight, at right angles to and at a relatively steady speed past a reading head, and difficulties can arise in the form of faulty sorting and incorrect recording if the coded information is not fed sufficiently accurately along the predetermined path, or if the feed speed is not sufficiently uniform.

The object of the present invention is to provide a method in which reading is independent of the speed of the item and to a large extent independent of the orientation and location of the coded information in relation to the reading head.

The method according to the invention is characterized by the fact that objects are located individually in or caused to pass through the field of vision of at least one video camera, which records an optical reproduction on the screen of the camera of the visual, coded information, and by the fact that the method employs a code comprising at least one group of parallel lines or concentric rings, whose number, widths, colours, spacing or order clearly express the said information in such a way that the complete data picture can be registered by a single line scanning, after which the video signals produced by the camera can be employed via electronic circuits to control sorting or recording means.

The said method permits registration to be carried out at a speed that makes the speed of movement of the object of little significance, the line-scanning speed being conducted at 5 km. per second, compared to which the object to be recorded, even if passing through the field of vision on a fast-moving conveyor, would be seen as stationary. A further benefit of the method is that the coded information can be placed at any point on the surface of the object facing the video camera, provided that the code enters the camera's field of vision, since one or more line-scanning operations will always sweep across the code. On account of the camera's depth of focus the distance between the object and the camera could also be allowed to vary within fairly wide limits, e.g. ±10 per cent, without a failure on the part of the camera to register the item because of the out-of-focus optical picture.

The method as described in the invention is thus particularly suitable for use in a package sorting system, in which the objects could be packages and parcels of widely differing size and shape and in which the coded information can be located at more or less any point on the surface of the packages.

The code can in addition to or instead of information on the sorting destination incorporate other symbols, e.g. stock numbers, prices or freight charges, and these FIGS. can be registered and then processed in a standard computer, which could if required produce them in printed form.

The form of execution of the method described in the invention employs a code which produces every one of the numbers zero to nine by using a maximum of three lines located at uniform intervals and with a maximum of two different widths of lines, such as a narrow line and a broad line, multidigital numbers being produced by the introduction of a wider space between the digits.

A benefit of this arrangement is that the code occupies a minimum amount of space in the direction of registration, which is of particular importance if the information takes the form of multiple digit numbers, and at the same time the code can readily be read visually as a modified form of Roman numbering.

In a second form of execution of the method described in the invention a code is employed in which immediately preceding and immediately following the lines representing the information applying specifically to the individual object, a varied combination of lines and spaces is added to indicate the beginning and ending of the said information.

A benefit of this form is that although the code may have been registered in the reverse direction to the correct one, it is possible to take steps to prevent an incorrect reading since the above-mentioned varied combination of lines and spaces will make the two directions of registration plain.

In a third form of execution of the method described in the invention a code is employed in which the widths of lines and widths of spaces are so fixed that when the code is scanned in any direction from 90° to 45° from the direction of the lines, the width of the narrow line measured in the direction of scan is less than the width of the wide line at right angles to the direction of the lines, and the width of the narrow space measured in the direction of scan is less than the width of the wide space at right angles to the direction of the lines.

A benefit of this form is that although scanning is conducted in a direction that forms an angle of from 90° to 45° to the direction of the lines, there will always be sufficient difference in the scanning length of lines and spaces of different widths to guarantee in registration that the camera can distinguish between the said widths of lines and spaces.

A fourth form of execution of the method described in the invention employs a code with a minimum of two, identical groups of mutually parallel lines, the lines of one group being a repetition of those of the other—but in reverse order of appearance.

A benefit of this form is that at least one of the groups will ensure a correct registration, and no other precautions are required than a system by which only a registration which commences and concludes with an appropriate varied combination of lines and spaces will produce the video signals required to actuate sorting or recording means.

A fifth form of execution of the method described in the invention employs a code with a minimum of two identical groups of mutually parallel lines, the lines of one group forming an angle, preferably of 90°, with the lines of the other group.

A benefit of this form is that regardless of the direction of lines on the label, stamp or other marking device in relation to the line-registration direction of the video camera, there will always be at least one group of lines registered at an angle of between 90° and 45° to the direction of the lines, which will end ensure a correct decipher of the code.

In a sixth form of execution of the method described in the invention the video camera emits both a direct video signal containing pulses corresponding to the lines of the code, and an inverted video signal containing pulses corresponding to the spaces, or vice versa, the direct signal being employed as information pulse and the inverted signal being employed as the control pulse for decoding the information pulses, which would provide a simple and reliable separation of the information and control pulses for lines and spaces.

The invention also concerns a piece of apparatus for executing the method described in the invention, the apparatus being peculiar in that at least one video camera is so located in relation to the object that at least one piece of visual, coded information on the object is optically reproduced on the screen of the camera and registered by the camera's line-scanning, the camera output being connected to an electronic circuit adapted in order to distinguish between the video signals produced by the camera, which electronic circuit is coupled to a decoding circuit adapted to decipher the assorted signals and to transmit corresponding control signals to a control circuit for sorting and recording means.

A benefit of this apparatus is that registration occurs over a shorter period than in existing apparatus used for execution of existing methods of the above-mentioned type, consequently objects to be sorted or recorded require only briefly to be placed in the camera's field of vision or to pass through the latter, the new apparatus's sorting or recording capacity per time unit therefore greatly exceeding that of existing apparatus. A further benefit is that the coded information can be placed at any point on the surface of the object facing the video camera provided the code enters the camera's field of vision, since one or more line scans will always sweep across the code.

One form of execution of the apparatus described in the invention is peculiar in that it incorporates a number (e.g. five) of separator circuits so designed as to separate the information and control pulses according to length in a corresponding number of groups, permitting an identification and separation of the lines and spaces forming part of the coded information.

A second form of execution of the apparatus described in the invention has decoding circuits and AND-circuits adapted in order that the control pulses from a number of the separator circuits direct the decoding circuits to decode the information pulses from the other separator circuits correctly, irrespective of direction of scan, which permits a single piece of coded information to be registered from the front or from the back.

A third form of execution of the apparatus described in the invention has a digital position circuit, adapted and controlled in order that the number produced by the decoding process is located in the digital position where it belongs, regardless of direction of scan of the code, which permits all the coded information to be registered from the front or from the back.

A fourth form of execution of the apparatus described in the invention has a system of existing counter circuits coupled in after the decoding circuits to ensure that the decoded numbers are repeated a number of times (e.g. five) before being fed into the apparatus's output circuit, thus providing a high degree of certainty that the data has been read correctly, since a number (e.g. five) of identical readings are required before the result is issued.

A fifth form of execution of the apparatus described in the invention has a reading circuit which is constructed to ensure that output is not effected until the output circuits have received full data in respect of the total number of digits in the code, which has the effect of ensuring that, for example, in a system of four-digit information output is not effected until all four digits are received.

A sixth form of execution of the apparatus described in the invention is so constructed that a pulse through monostable multivibrators, a bistable multivibrator, and AND-circuits, when the pulse corresponding to the start pulse and another pulse corresponding to the stop pulse are encountered in scanning, opens the way for line-synchronizing pulses to a counter circuit which, via a monostable multivibrator retards the output circuits when the latter multivibrator has received a predetermined (e.g. ten) number of line-synchronizing pulses.

This ensures that the coded information must be correctly read the desired number of times in, for example, ten consecutive scannings.

In a particularly adapted form of execution of the apparatus described in the invention the separator circuits are coupled to a time/voltage converter in such a manner that separation of information and control pulses according to length is effected in relative proportion to the length of the starting pulse, the time/voltage converter being constructed in such a way that for a period of to time corresponding to the scanning of the code it maintains a reference voltage proportionate to the length of the starting pulse, thus permitting the difference in the widths of the individual lines or spaces to be reduced, the angle of registration to the direction of the code lines being unimportant, provided that a satisfactory difference is evident in registering the code at right angles to the direction of the lines.

BRIEF DESCRIPTION OF THE DRAWING

A further description of the invention is given below, with reference to the accompanying illustrations, in which:

FIG. 1 shows a code for visual, coded information for use in effecting the method described in the invention, which code incorporates digits zero to nine, the digits being expressed by a combination of parallel lines A and B of different widths, a narrow line A with a width of $T_s$ and a wide line B with a width of $T_b$, the lines being separated by fixed spaces C with a width of $t_s$, which on the FIG. has the same width as narrow line A. As FIG. 1 shows, no more than three lines are required to depict each of the digits from zero to nine.

FIG. 2 shows an example of coded data which, when scanned from left to right on the illustration, represents the number 3089 by employing the lines and spaces shown in FIG. 1, there being placed between the code for each digit a space D with a width of $t_b$, which is greater than the width ($t_s$) of space C, to separate the digits.

The widths of the lines and the widths of the spaces in the invention have been selected in such a manner that, when the code is scanned at any angle from 45—90° to the direction of lines, the width of the narrow line A measured in the direction of scan is less than the width of the wide line B measured at right angles to the direction of the lines, and the width of the narrow space C in the direction of scan is less than the width of the wide space D measured at right angles to the direction of the lines, In FIGS. 1 to 5 the following values have been selected for the different widths: $T_s = 1$ mm., $T_b = 3$ mm., $t_s = 1$ mm., $t_b = 3$ mm., and consequently when the direction of scan is at 45° to the direction of lines, then $T_s$ 19 2 < $T_b$ and $t_s$  **2 <$t$b. For the sake of simplicity and clarity therefore the widths of lines and digits are indicated by the symbol T, while the widths of spaces are indicated by $t$, in both cases in connection with indices for the relative widths.

For technical printing reasons, irrespective of the number of lines and spaces, the same width has been reserved for all digits i.e. a width of $T_c$, which equals the widest line codes, i.e. those for digits zero, four, seven and eight. After digits one, two, three, five, six and nine the space between the strokes of two consecutive digits will therefore be greater than after digits zero, four, seven and eight.

Figure 1:
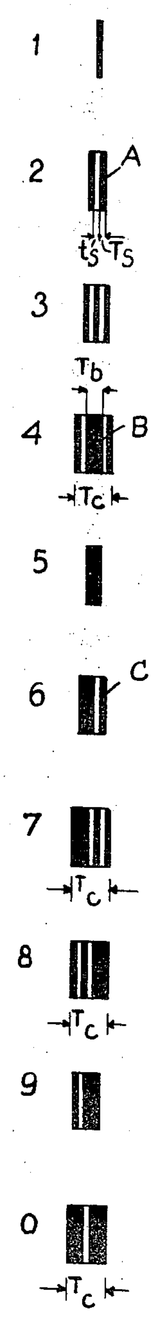
FIG. 1 shows a design for a piece of visual, coded information in the form of a number of parallel lines and intervening spaces for use in exercising the method described in the invention, the code representing the digits zero to nine.
Figure 2:
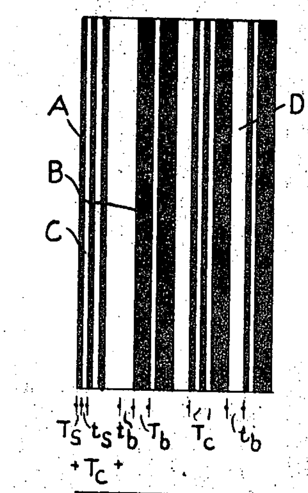
FIG. 2 shows an example of the application of the code illustrated in FIG. 1, the combination representing the number 3089.

As the code shown in FIG. 2 is symmetrical in the direction of scan in only a few special circumstances, it is necessary in order to obtain a correct reading of the number value, regardless of direction of scan, to determine a particular direction of reading. In accordance with the invention this is accomplished by employing a code which, immediately before and immediately after the lines representing the information peculiar to the individual object, adds a varied combination of lines and spaces indicating the start and finish of the said information.

Figure 3:
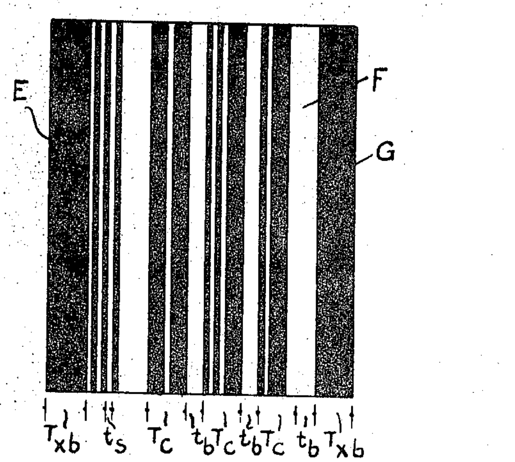
FIG. 3 shows another example of the same information, but in addition to the number 3089 it indicates the spacing of the direction of reading and the starting and stopping lines for controlling the registration of the code.

The design for this code is shown in FIG. 3 in which a starting line E is placed at the beginning of the code, having a width of $T_{xb}$, which is an extra width, i.e. at least a little more than twice the width of $T_b$, together with a narrow space which in the example in FIG. 3 has been given the same width as $t_s$, whereas at the end of the code a Wide space F with a width of $t_b$ is followed by a stop line G which can, for example, have a width of rather more than twice $T_b$, in which case starting line E and stop line G each has a width of $T_{xb}$, as seen in FIG. 3.

Lines E and G are used to start and stop the decoding process respectively, while spaces C and F are employed to indicate the correct direction of reading of the code, so that the code can be correctly identified irrespective whether it is read in one or the reverse direction.

In the example of the code shown in FIG. 3, the $T_{xb}$line width equals 7 mm.

Other widths than those quoted in the foregoing may be employed provided that there is a registrable difference between the selected widths. The greatest width $T_c$ of any single-digit character, in the application of the code shown in FIGS. 1—3 and the dimensions of lines and spaces quoted above, is equal to 7 mm., and the total length of code for a piece of four-digit information complete with starting, stop and directional signals is a maximum of 55 mm. A system of four-digit information provides 10,000 possibilities of combination, i.e. all numbers from 0000 to 9999 can be indicated by the code shown in FIGS. 1—3.

Figure 4:
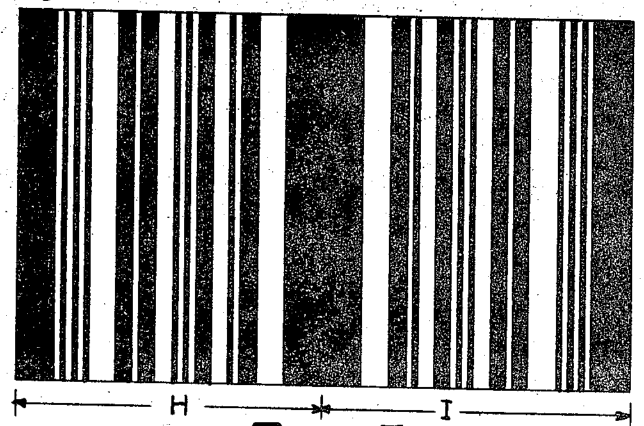
FIG. 4 shows a third example of the application of the code with a combination incorporating a reverse doubling of the code illustrated in FIG. 3.

In a design for the code as shown in FIG. 4, a code in accordance with the invention is employed with at least two identical groups, H and I, of parallel lines and accompanying spaces, the lines of group I being a repetition of those of group H in reverse, thus ensuring that at least one of the groups will be registered in the correct reading direction.

As labels, stamps or similar markings on objects cannot always be expected to be so placed that the coded lines are read at right angles to the direction of scan, a code can be designed in accordance with the invention with at least two identical groups, K and L, of parallel lines and accompanying spaces (see FIG. 5), the lines of group L forming an angle, preferably of 90°, with the lines of group K. Consequently, regardless of the direction of the lines on the label, stamp or other marking in relation to the line registration direction of the video camera, at least one of the groups of lines, K or L, will register at an angle of between 90° and 45° to the direction of lines, which ensures a correct decoding of the code.

Figure 5:
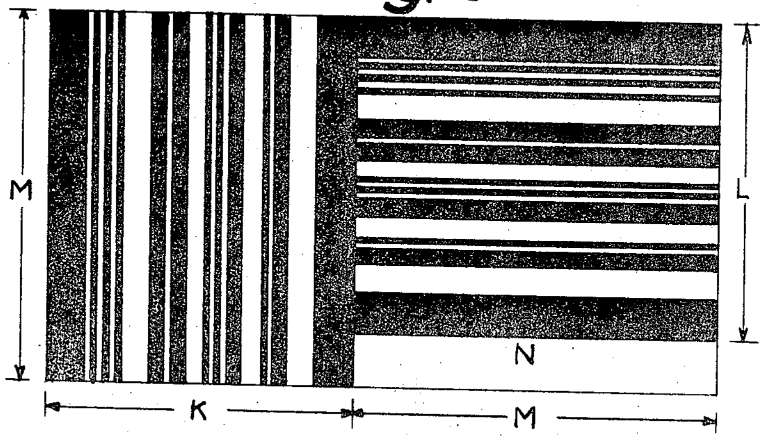
FIG. 5 shows a design for a label for use in connection with the method described in the invention, incorporating two groups of parallel lines and spaces, and a space for text.

To ensure that a suitable number of scannings provides a correct reading even though the scanning is conducted at an angle of about 45° to the longitudinal direction of the coded lines, the length M of the code lines, as shown in FIG. 5, can be made somewhat longer than the lengths of groups K and L, which in four-digit information, as mentioned in the earlier example, can be a maximum of 55 mm. A suitable length of line (M) could, for example, be 65 mm. An open space, N, resulting from this arrangement could, for example, as shown in FIG. 5, be employed for ordinary text or for repeating the code in ordinary Arabic numerals.

Figure 6:
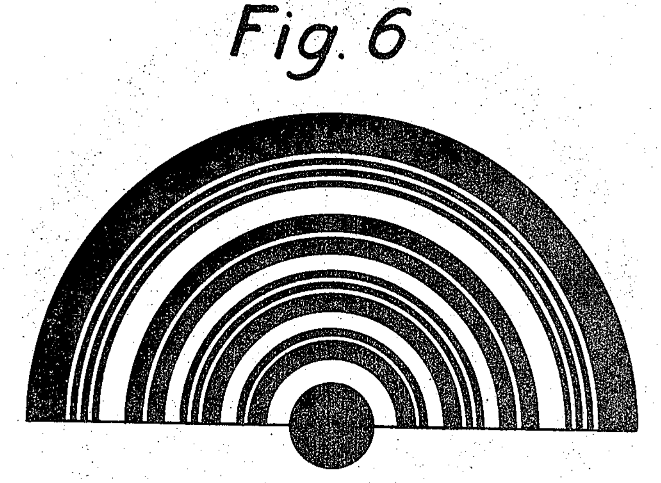
FIG. 6 shows an amended design for the code in the form of concentric semicircles of rings and intervening spaces.
Figure 7:
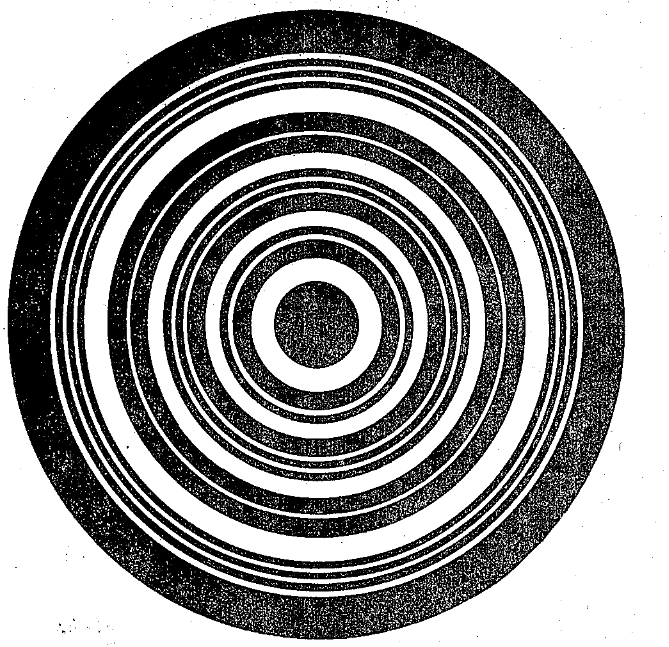
FIG. 7 shows another amended design for the code in the form of concentric circles of rings and intervening spaces.

FIGS. 6 and 7 show amended designs for the said code, comprising semicircles and full circles with intervening spaces, and corresponding to the code shown in FIG. 4.

Figure 8:
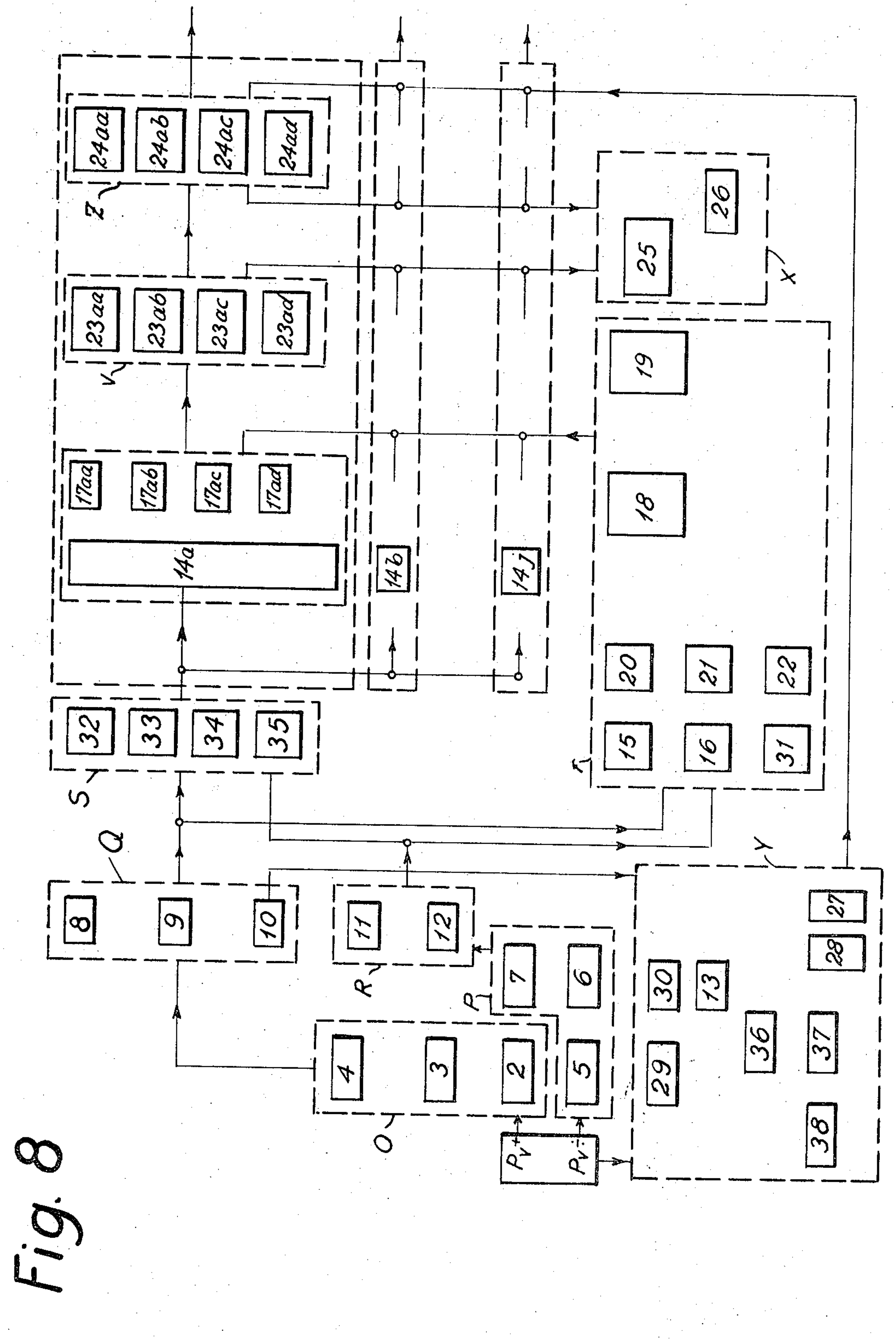
FIG. 8 shows a block diagram for a design for an installation to execute the method described in the invention.

FIG. 8 shows a block diagram for a design for a system of operating the method in accordance with the invention with output in the decimal system. The block diagram is explained below.

From a video camera 1 located in relation to objects to be sorted or recorded in order that the objects pass through the field of vision of the camera 1, each object being affixed with visual, coded information, a direct video signal PV+, and an inverted video signal PV— are fed out. The former signal, PV+, is used to transmit information relating to the width of the code lines, and the latter signal, PV—, is used for information relating to the widths of the spaces, each signal being transmitted through its own pulse-forming circuit, O and P, to separator circuits Q and R, where the signals are divided into pulses corresponding to narrow, wide and extra-wide lines, and narrow and wide spaces. Pulses from the separator circuits are transmitted partly to AND-circuits S and partly to digit-position circuit T. Impulses from the AND-circuits, S, are transmitted to a number (here, 10) of decoding circuits, U. Into the decoding circuits are also fed control pulses from the digit position circuit. The decoding circuits are controlled according to the direction of scanning, transmitting pulses to a number (here, 10) of identical counter circuits, V, which correspond to the numerical value of the digits zero to nine inclusive and to the position of the digits: ones, tens, hundreds and thousands. When four of the 10 counter circuits, V, have received five pulses, the information is outputted through a number (here, 10) of identical output circuits, Z, to control means for sorting or recording devices not shown in the drawing, with the aid of output circuit X. To ensure that the apparatus is always reset before a new group of registrations commences, a pulse from one of the separator circuits, namely the circuit for the starting/stop pulse, controls a reset circuit, Y, so that the tenth line-synchronizing pulse occurring after a scanning in which both starting and stop signals have been included resets the system's exit circuit, Z. Circuits 0-Z are indicated in FIG. 8 by broken outlines, and inside each outline the components of the circuit are indicated by numbers, described in details under the discussion of the wiring diagram in FIG. 9, see below.

Figure 9:
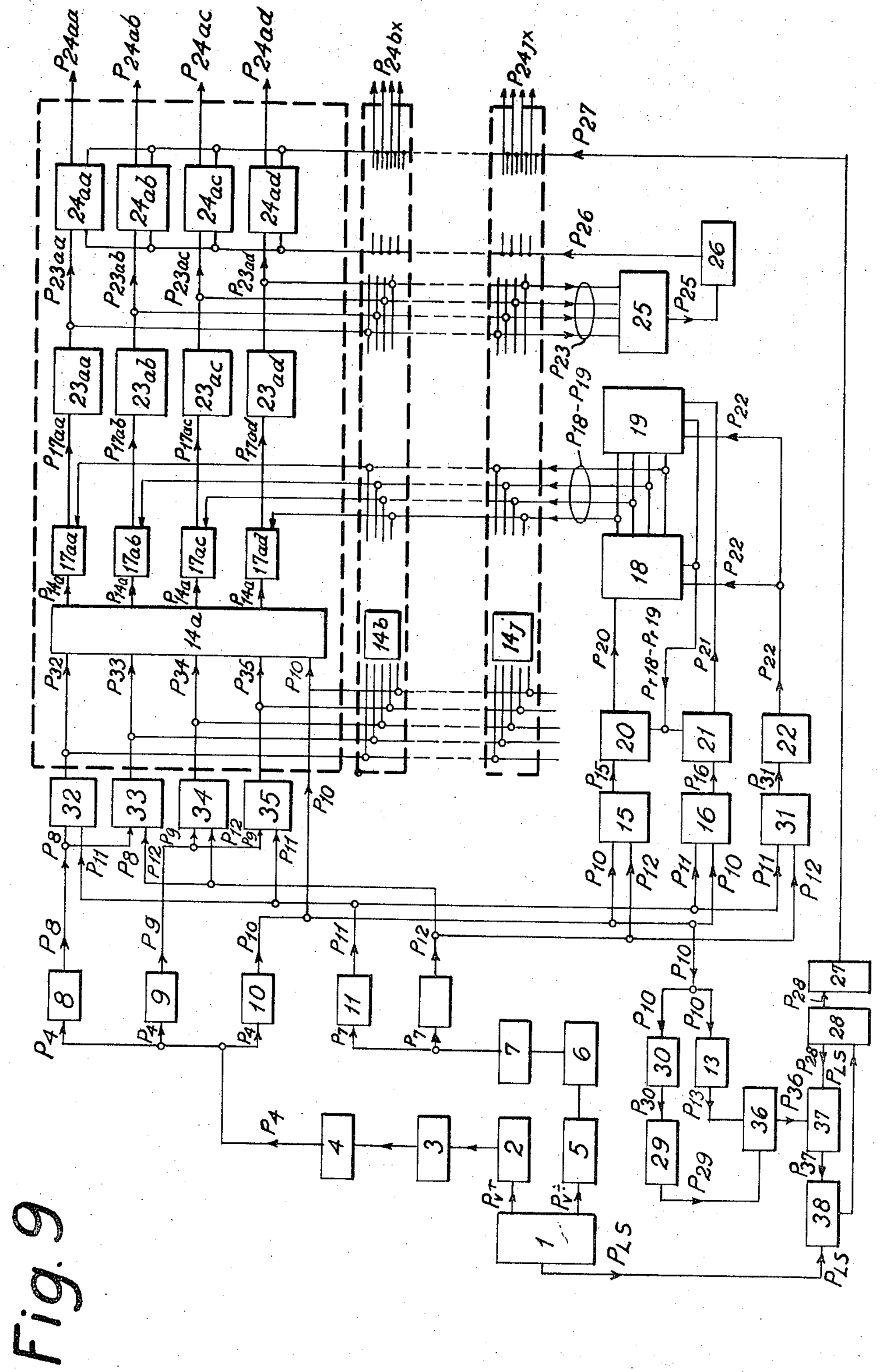
FIG. 9 shows a more detailed wiring diagram for the same design.

The operation of the system is described here with reference to FIG. 9, which shows a wiring diagram for a particularly adapted design for the system in accordance with the invention, intended for outputting (in the decimal system) four-digit information by employing a code shown in FIG. 3 and meeting the above-mentioned requirement of five identical results out of 10 consecutive scannings.

As described above, video camera 1 transmits a direct video signal, PV+, and an inverted video signal, PV—, each of which is fed separately through a number of pulse-forming circuits, composed of filters (2 and 5 respectively), amplifiers (3 and 6 respectively) and monostable multivibrators, 4 and 7.

An exit pulse, P4, is fed from the multivibrator, 4, to three separator circuits, 8, 9 and 10, which are constructed in such a way that separator circuit 8 permits the passage only of pulses with a duration corresponding to narrow line $T_s$, separator circuit 9 permits the passage only of pulses with a duration corresponding to wide line $T_b$, and separator circuit 10 permits the passage only of pulses with a duration corresponding to extra-wide line $T_{xb}$. A pulse, P7, is transmitted from multivibrator 7 to two separator circuits, 11 and 12, which are constructed in such a way that separator circuit 11 permits the passage only of pulses with a duration corresponding to narrow space $t_s$, while separator circuit 12 permits the passage only of pulses with a duration corresponding to wide space $t_b$ or wider. A pulse, P8, corresponding to the duration of narrow line $T_s$, is transmitted from the separator circuit 8 to AND-circuits 32 and 33. A pulse, P9, corresponding to the duration of wide line $T_b$, is transmitted from separator circuit 9 to AND-circuits 34 and 35. These pulses, P8 and P9, represent the numerical information peculiar to the object. A pulse P11, corresponding to the duration of narrow space $t_s$, is transmitted from separator circuit 11 to AND-circuits 32 and 35, while a pulse, P12, corresponding to the duration of wide space $t_b$ or wider spaces, is transmitted from separator circuit 12 to AND-circuits 33 and 34. These space pulses indicate digit spacing and in addition the scanning direction of the numerical information located on the object. Pulses P32, P33, P34 and P35 are transmitted from AND-circuits 32—35 to ten decoding circuits, 14*a*, 14 *b*, 14 *c* .... 14 *j*, corresponding to digits zero to nine. Decoding circuits 14 *a* —14*j* are made up of a recognized pattern of connected and reciprocally reacting monostable multivibrators.

To cancel the setting on decoding circuits 14*a* —14*j* of the preceding code registration, pulse P10, having a duration equal to that of extra-wide line $T_{xb}$, is transmitted to each of the decoding circuits 14*a*—14*j*.

In order to input the registered, characteristic information in the proper order of digits and to open the decoding circuits 10 groups of AND-circuits, which groups each comprise four AND-circuits termed 17*aa* ..... 17*jd*, where the first index stipulates the index for the appropriate decoding circuit 14*a*—14*j*, and the second index stipulates the digital position in the four-digit numerical information, pulses P10 and P12 are transmitted to an AND-circuit, 15, common to these pulses, while pulses P11 and P10 are transmitted to an AND-circuit, 16, common to these pulses, and pulses P11 or P12 are transmitted to an OR-circuit, 31, which emits pulse P31 to a monostable multivibrator, 22, which then transmits pulses P22. From AND-circuit 15 pulse P15 is transmitted to a bistable multivibrator, 20, which transmits pulse P20 to a four-part circuit, 18, which is constructed in a recognized manner and which feeds the first pulse P22 indicating the digital position of the thousands digit to the 10 AND-circuits 17*aa*, 17*ba*, 17*ca* .... 17 *ja* in the first group; the second pulse P22 indicating the digital position of the hundreds digit to the 10 AND-circuits 17 17*ab*, 17*bb*, 17*cb* ..... 17*jb* in the second group; the third impulse P22 indicating the digital position of the tens digit to the 10 AND-circuits 17*ac*, 17*bc*, 17*cc* ..... 17 17*jc* in the third group; and finally feeding the fourth pulse P22 indicating the digital position of the ones digit to the 10 AND-circuits 17*ad*, 17*bd*, 17*cd* ..... 17*jd* in the fourth group of AND-circuits.

AND-circuit 16 transmits pulse P16 to a bistable multivibrator, 21, which then transmits a pulse, P21, to a second four-part circuit, 19, which is also constructed in a recognized manner and which feeds the first pulse P22, corresponding to the ones digit position, to the 10 AND-circuits 17*ad*, 17*bd*, 17*cd* ..... 17*jd* in the fourth group of AND-circuits; and then the second pulse P22 corresponding to the tens digit position, to the ten AND-circuits 17*ac*, 17*bc*, 17*cc* ..... 17*jc* in the third group of AND-circuits; and so on.

The two multivibrators 20 and 21 are reset by pulses Pr18 or Pr19 respectively, which are transmitted by four-part circuits 18 or 19 when these circuits have distributed the four P22 pulses.

When one of the 10 open AND-circuits, 17*xx*, all of which received the first pulse, P18 or P19 respectively, which receives pulses P14 from the decoding circuits, has transmitted five pulses P17 to a five-counter circuit, 23, a pulse P23 is transmitted to a first input for a related exit circuit, 24*xx*. An AND-circuit, 25, which is connected to the exit of the five-counter circuit, 23, transmits pulse P25 when circuit 25 from four of the five-counter circuits 23 has received pulses P23, which indicates that pulses for all digits in the four-digit number have been transmitted to exit circuit 24. Pulse P25 is fed to a monostable multivibrator, 26, which transmits a pulse, P26, to another set of inputs on exit circuit 24. This makes the four activated exit circuits, 24*xx*, transmit pulses P24, which in a recognized manner are employed to control sorting or recording apparatus not illustrated on the diagram.

Pulse P10 is fed to a monostable multivibrator, 13, and another monostable multivibrator, 30, after which the difference in time between pulse P10 and an exit pulse, P30, from multivibrator 30 is so adjusted as to be less than the distance between $P10_{start}$ and $P10_{stop}$, e.g. 0.3 × distance between $P10_{start}$ and $P10_{stop}$, i.e. between the first extra-wide line $T_{xb}$ to be scanned and the last extra-wide line $T_{xb}$ to be scanned. A pulse P13 is fed from monostable multivibrator 13 to the one input of an AND-circuit 36. Exit pulse P30 is transmitted to a monostable multivibrator, 29, whose exit pulse P29 is of such a length that the sum of the length of P29 and the difference in time between $P10_{start}$ and P30 is greater than the distance between $P10_{start}$ and $P10_{stop}$, which would be the case in the former example, if the length of P29 was, for example, fixed at 0.8 × distance between $P10_{start}$ and $P10_{stop}$. Exit pulse P29 is transmitted to the other input of AND-circuit 36. When both inputs are activated simultaneously, which can happen only if $P10_{start}$ and $P10_{stop}$ occur in the same line scanning, AND-circuit 36 transmits a pulse P36, which causes a bistable multivibrator, 37, to emit pulse P37, which opens AND-circuit 38, which permits passage to ten-counter circuit 28 of line-synchronizing pulses $P_{LS}$ from the video camera.

When ten-counter circuit 28 has received 10 pulses $P_{LS}$, it emits pulse P28, which is fed to a monostable multivibrator, 27, which transmits pulse P27, which serves to reset exit circuits 24*aa* ..... 24*jd*. Pulse P28 is fed also to bistable multivibrator 37, which is also reset. The system is then ready to receive new information.

Figure 10:
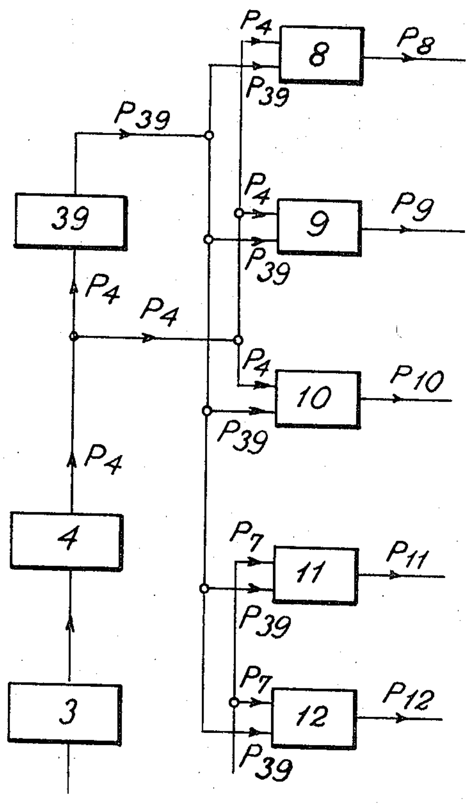
FIG. 10 shows an amended design for the same purpose.

In the amended design of system shown in FIG. 10 in accordance with the invention separator circuits 8, 9, 10, 11 and 12 are controlled by a reference level P39, which permits a separation in which the individual elements of the code are separated according to their relative lengths, as opposed to the earlier mentioned standard design of system in accordance with the invention in which separation occurs according to fixed lengths. Reference level P39 is transmitted by a time/voltage converter, 39, which is so constructed that reference level is proportionate to the registration length of the extra-wide line T*xb*, i.e. the starting line, and is maintained for a period of time corresponding to a scanning of the code. The time/voltage converter, 39, is inserted between the monostable multivibrator, 4, for video signal PV+ and separator circuits 8, 9, 10, 11 and 12, all of which receive reference level P39, while pulses P4 and P7 are transmitted to the separator circuits as described above in connection with FIG. 9, and the remaining part of the system is executed as shown and described in connection with FIG. 9.

We claim:

1. A method for automatic sorting or recording of objects each of which by labels, stamping or similar marking is affixed with visual, coded information indicating the sorting destination of the individual object or other information peculiar to the object, which information is employed to control sorting or recording means, characterized by the fact that the objects are individually placed or caused to pass through the field of vision of at least one video camera, which registers an optical picture on the camera screen of the visual, coded information, and by the fact that a code is employed comprising at least one group of parallel lines or concentric rings, whose number, width, colour, spacing or order clearly express the said information in such a way that the complete information group can be registered by a single line-scanning and the video signals transmitted by the camera are employed via electronic circuits to control sorting or recording apparatus.

2. A method in accordance with claim 1, characterized by the fact that a code is used, reproducing each of the digits zero to nine by means of a maximum of three lines with a constant intervening space and with a maximum of two different widths of lines, such as a narrow line and a wide line, multidigit numbers being obtainable by inserting a wider space between digits.

3. A method in accordance with claim 1, characterized by the fact that a code is used in which combinations of different lines and spaces are placed immediately in front of and immediately after the group of lines indicating the information peculiar to the individual object in order to signify the beginning and end of the said information group.

4. A method in accordance with claim 1, characterized by the fact that a code is used in which the width of the lines and spaces respectively is so selected that in a scanning of the code in either direction at an angle of between 90° and 45° to the direction of the lines, the width of the narrow line measured in the direction of scan is always less than the width of the wide line measured at right angles to the direction of the line, and the width of the narrow space measured in the direction of scan is always less than the width of the wide space measured at right angles to the direction of the lines.

5. A method in accordance with claim 1, characterized by the fact that a code is used with at least two identical groups of parallel lines, the lines of one group forming a reverse repetition of those of the other group.

6. A method in accordance with claim 1, characterized by the fact that a code is used with at least two identical groups of parallel lines, the lines of one group forming an angle, preferably of 90°, with the lines of the other group.

7. A method in accordance with claim 1, characterized by the fact that the video camera transmits both a direct video signal containing pulses corresponding to the lines of the code and an inverted video signal containing pulses corresponding to spaces, or vice versa, the direct signal being used as an information pulse and the inverted signal being used as a control pulse for decoding the information pulses.

8. A system for effecting the method in accordance with claim 1, comprises at least one video camera disposed in relation to the object so that the visual, coded information affixed to the object is optically reproduced on the camera screen and registered by the camera scanner 7; electronic sorting means connected to the camera output to sort out the video signals transmitted by the cameras; a plurality of decoding circuits coupled to the output of said electronic sorting means to decode the respective signals; output circuit means coupled to the output of said decoding circuits for energization thereby; and sorting apparatus coupled to said output circuit means for sorting said objects.

9. An apparatus in accordance with claim 8, in which said electronic sorting means comprises a plurality of separator circuits (8,9,10,11 and 12) for separating the information and control pulses from said camera according to length in a corresponding number of groups.

10. An apparatus in accordance with claim 9, further comprising a plurality of AND-circuits, said decoding circuits being coupled to said separator circuits through said AND-circuits wherein control pulses from one group of said separator circuits (11, 12) set the decoding circuits to decode information pulses from another group of said separator circuits (8, 9 and 10) correctly, irrespective of direction of scanning.

11. An apparatus in accordance with claim 8, in which said decoding circuits, comprise a plurality of digital position circuits (15,16,18,19,20,21, 22 and 31) coupled to said electronic sorting means for being controlled in such a manner that the number resulting from decoding is placed in the digit position in which it belongs, irrespective of the direction of scanning.

12. An apparatus in accordance with claim 8, further comprising a plurality of counter circuits (23*aa*—23*jd*) coupled between said decoding circuits and said output circuit means to ensure that the decoded numbers are repeated a specific number of times, e.g. five, before being fed to said output circuit means (24).

13. An apparatus in accordance with claim 12, characterized by the fact that said output circuit means comprises a first group of output circuits (25 and 26) and a second group of output circuits (24) are coupled together to ensure that the output to said sorting apparatus is effected after said second group of output circuits have received the full amount of information for the total number of digits in the code.

14. An apparatus in accordance with claim 12 further comprising additional circuitry including a plurality of monostable multivibrators (13, 30 and 29), a bistable multivibrator (37), AND-circuits (36 and 38), and circuit means for coupling a first pulse through said additional circuitry when both said first pulse corresponding to a starting pulse and a second pulse corresponding to a stop pulse occur in a scanning, and further comprising a counter circuit (28) a monostable multivibrator (27), and means for coupling said first pulse to open a path for a plurality line-synchronizing ($P_{LS}$) from the video camera (1) to said counter circuit (28), and through said monostable multivibrator (27) to reset the output circuits (24), when it has received a predetermined number e.g. 10, of said line-synchronizing pulses ($P_{LS}$).

15. An apparatus in accordance with claim 9, further comprising a time/voltage converter (39) connected to said separator circuits (8, 9, 10, 11 and 12) for separating information and control pulses according to length relative to the length of a starting pulse, said time/voltage converter for operating in such a way that for a period of time corresponding to a scanning of the code it maintains a reference voltage which is proportionate comprising means the length of the starting pulse.